(12) United States Patent
Crozier et al.

(10) Patent No.: US 11,589,704 B2
(45) Date of Patent: Feb. 28, 2023

(54) BEVERAGE PREPARATION DEVICE WITH BEVERAGE DRAINING MEANS

(71) Applicant: SOCIETE DES PRODUITS NESTLE S.A., Vevey (CH)

(72) Inventors: Etienne Crozier, La Neuveville (CH); Guillaume Heisel, Bienne (CH); Adrien Hoffet, Prilly (CH); Marco Magatti, Lausanne (CH); Damien Romand, La Neuveville (CH); Jean-Luc Thuliez, Le Landeron (CH); Robin Zimmermann, La Neuveville (CH)

(73) Assignee: Societe des Produits Nestle S.A., Vevey (CH)

( * ) Notice: Subject to any disclaimer, the term of this patent is extended or adjusted under 35 U.S.C. 154(b) by 629 days.

(21) Appl. No.: 16/603,305

(22) PCT Filed: Apr. 9, 2018

(86) PCT No.: PCT/EP2018/058970
§ 371 (c)(1),
(2) Date: Oct. 7, 2019

(87) PCT Pub. No.: WO2018/189073
PCT Pub. Date: Oct. 18, 2018

(65) Prior Publication Data
US 2021/0106167 A1    Apr. 15, 2021

(30) Foreign Application Priority Data

Apr. 11, 2017   (EP) .................................... 17165968

(51) Int. Cl.
*A47J 31/36*   (2006.01)
*A47J 31/46*   (2006.01)
(Continued)

(52) U.S. Cl.
CPC ........... *A47J 31/461* (2018.08); *A47J 31/005* (2013.01); *A47J 31/3623* (2013.01);
(Continued)

(58) Field of Classification Search
CPC .... A47J 31/4425; A47J 31/36; A47J 31/3604; A47J 31/3619; A47J 31/3623;
(Continued)

(56) References Cited

U.S. PATENT DOCUMENTS 6,006,603 A    12/1999  Molnar et al.
8,327,755 B1   12/2012  Michalek et al.
(Continued)

FOREIGN PATENT DOCUMENTS

CH           702947      10/2011
CN       203252449 U    10/2013
(Continued)

*Primary Examiner* — Reginald Alexander
(74) *Attorney, Agent, or Firm* — K&L Gates LLP

(57) ABSTRACT

Beverage preparation device (1) for preparing a beverage from a beverage dose (2) comprising: —a brewing unit (3) for receiving the dose (2) and preparing a beverage from the ingredients contained within the dose and pressurized liquid injected in the dose, —a pressure pump (4) for supplying pressurized liquid to the brewing unit (3), —beverage dispensing means (5) connected to the brewing unit and comprising a beverage injector (6) arranged for dispensing the beverage through a bottom (8) of a beverage receptacle (7); wherein the beverage dispensing means (5) comprises a residual beverage draining valve (9), between the beverage injector (6) and the brewing unit (3), which is arranged to be moved between a beverage dispensing position and a residual beverage draining position, wherein the residual beverage draining valve (9) and/or the beverage receptacle (7) comprise valve activation means (10) arranged to move the draining valve between a beverage dispensing position in response to the engagement of the bottom of the receptacle
(Continued)

with the beverage injector and a residual beverage draining position in response to the removal of receptacle from the beverage injector (6).

9 Claims, 11 Drawing Sheets

(51) Int. Cl.
*A47J 31/52* (2006.01)
*A47J 31/00* (2006.01)
*A47J 31/58* (2006.01)

(52) U.S. Cl.
CPC ....... *A47J 31/3633* (2013.01); *A47J 31/3676* (2013.01); *A47J 31/468* (2018.08); *A47J 31/5251* (2018.08); *A47J 31/58* (2013.01); *A47J 31/3604* (2013.01)

(58) Field of Classification Search
CPC ................ A47J 31/3628; A47J 31/3633; A47J 31/3676; A47J 31/3695
See application file for complete search history.

(56) References Cited

U.S. PATENT DOCUMENTS

| | | | |
|---|---|---|---|
| 9,398,826 | B2 | 7/2016 | Favero et al. |
| 10,448,780 | B2 | 10/2019 | Ryser et al. |
| 2010/0186851 | A1 | 7/2010 | Rusch et al. |
| 2012/0325094 | A1 | 12/2012 | Guindulain Vidondo |
| 2017/0095832 | A1 | 4/2017 | Tang et al. |

FOREIGN PATENT DOCUMENTS

| | | |
|---|---|---|
| CN | 103892710 A | 7/2014 |
| CN | 105686644 A | 6/2016 |
| CN | 105725810 A | 7/2016 |
| CN | 106168295 A | 11/2016 |
| DE | 102008007254 | 8/2008 |
| DE | 102008022220 A1 | 11/2009 |
| JP | 2009089733 A | 4/2009 |
| WO | 2006055866 | 5/2006 |
| WO | 2014086915 | 6/2014 |
| WO | 2015173128 | 11/2015 |

BEVERAGE PREPARATION DEVICE WITH BEVERAGE DRAINING MEANS

CROSS REFERENCE TO RELATED APPLICATIONS

The present application is a National Stage of International Application No. PCT/EP2018/058970, filed on Apr. 9, 2018, which claims priority to European Patent Application No. 17165968.3, filed on Apr. 11, 2017, the entire contents of which are being incorporated herein by reference.

FIELD OF THE INVENTION

The invention relates to the field of beverage preparation in a beverage preparation device using doses containing ingredients. More particularly, the invention relates to a device for use in vehicles such a car or boat for example.

BACKGROUND OF THE INVENTION

The beverage preparation devices using doses containing beverage ingredients such as ground coffee are very popular for their convenience, the consistent quality and quick preparation.

Certain beverage devices have been developed more specifically for being installed in a low voltage vehicle such as the one described in EP1277428B1. The device is an espresso coffee machine designed for a vehicle using a low power source, comprising a reservoir for the water which is connected to a pump to convey the water to a heating element, which itself is connected to an extraction head for a portion of coffee, a mobile fastener for the said head with a means which makes it possible to displace the said fastener from a position of opening to a position of closure and vice versa.

WO2014086915A1 relates to a beverage preparation device comprising a brewing unit for receiving the capsule and preparing the beverage from the ingredients by injecting liquid into the capsule, a receptacle support means, beverage delivery means and injection means adapted to selectively open a portion of the outlet wall of the receptacle (e.g., bottom of the receptacle) and to establish fluid communication between the beverage delivery means and the receptacle. The advantage is that beverage can be filled from the bottom of the receptacle thereby avoiding beverage spilling on the surface of the device or vehicle.

The device of WO2014086915A1 further comprises emptying means designed for evacuating residual liquid from the beverage delivery means. The emptying means comprises a junction element connected to the beverage delivery means and movable by drive means for moving the emptying means in emptying position. However, a risk is that the activation of the emptying means is not well coordinated with the removal of the receptacle from the injection means. In such case, there could be a safety risk of a jet of residual hot beverage out of the injection means that could cause as well as safety issues (e.g., risk of burns). Furthermore, this system is relatively complicated and subject to failures and aging.

WO2015173128A1 relates to a beverage capsule device comprising beverage dispensing means with safety outlet valve adapted to selectively open a fluid communication from the beverage brewing unit to the outlet dependent on the presence and/or proximity of a receptacle being equipped with activation means for the outlet valve. More particularly, the beverage injection is closed by the outlet valve as soon as the activation means of receptacle are no longer acting with the device such as when the receptacle is removed. However, a small residual amount of beverage can sit between the brewing unit and the tip of the injector causing potential hygiene issues and/or forcing the reduction of the distance between the injector and the brewing unit.

The present invention aims at solving the inconvenients of the prior art by proposing a simple solution that resolves both the safety and hygiene issues.

SUMMARY OF THE INVENTION

For this, the invention relates to a beverage preparation device for preparing a beverage from a beverage dose comprising:
  a brewing unit for receiving the dose and preparing a beverage from the ingredients contained within the dose and pressurized liquid injected in the dose,
  a pressure pump for supplying pressurized liquid to the brewing unit,
  beverage dispensing means connected to the brewing unit and comprising a beverage injector arranged for dispensing the beverage through a bottom of a beverage receptacle;
wherein the beverage dispensing means comprises a residual beverage draining valve, between the beverage injector and the brewing unit, which is arranged to be moved between a beverage dispensing position and a residual beverage draining position,
wherein the residual beverage draining valve and/or the beverage receptacle comprise valve activation means arranged to move the draining valve between a beverage dispensing position in response to the engagement of the bottom of the receptacle with the beverage injector and a residual beverage draining position in response to the removal of the receptacle from the beverage injector.

Therefore, the main principle of the invention lies in the selective activation of a beverage draining valve which depends on the relative position of the beverage receptacle and the beverage injector. In particular, when the receptacle is disengaged from the beverage injector, the residual beverage contained in the dispensing means can automatically start being drained thereby both releasing the overpressure and cleaning the beverage dispensing means from the residual beverage. Therefore, the draining valve when activated by the activation means prevents hot beverage from splashing thereby ensuring safety and hygiene to the device.

In a preferred mode, the valve activation means comprises magnetic activation members complementarily arranged on the valve and receptacle respectively for moving by magnetic effect the draining valve from the beverage residual draining position to the beverage dispensing position. A magnetic activation provides a simple, reliable and quick changeover of the position of the valve. It also allows constant operation over time, without wear, and it is insensitive to humidity, temperature changes and dusts. Preferably, the magnetic activation members comprise a series of alternating magnetic poles arranged about the circumference of the bottom of the receptacle and a series of alternating magnetic poles arranged circumferentially in the residual beverage draining valve.

The valve activation means may comprises elastic return means for urging the draining valve back into the residual beverage draining position.

This system is particularly simple and requires neither control nor electrical connection or wires. Therefore the draining of residual beverage occurs even if the device is no longer under power thereby providing increased safety for the user.

The beverage dispensing means may comprise a first draining line connecting the beverage injector via the draining valve to a residual beverage reservoir when the draining valve is in the residual beverage draining position. Therefore, as soon as the beverage receptacle is removed, the liquid column contained in the beverage injector is instantaneously drained thereby immediately releasing the overpressure in the injector and avoiding spillage on top of the device.

Furthermore, the device may comprise a second draining line for draining residual beverage contained between the draining valve and the brewing unit. The second draining line may be opened to a residual beverage reservoir by effect of the opening of the brewing unit. Therefore, the full removal of the residual beverage from the beverage dispensing means can be obtained by the second draining line when the brewing unit is opened. The system can be kept simpler since it does not need additional mobile mechanical parts to provide the draining of the residual beverage. The opening of the brewing unit for full draining can also be controllably delayed from the immediate pressure release taken care by the draining valve. As a result, a smoother pressure release with lower risk of spillage can be noticed.

Preferably, the device may comprise control means arranged for immediately interrupting the pressure pump and/or opening of the brewing unit when the receptacle is removed from the beverage injector. The pressure pump may be stopped before the second draining line is opened so that pressure is released sooner and spillage can be fully avoided. The volume of residual beverage drained in the residual beverage reservoir is also consequently decreased.

In particular, the brewing unit comprises a beverage outlet part and a liquid injection part movably arranged relative to each other between an open position and a closed position. The device may further comprise a motor and a transmission for moving the beverage outlet part and liquid injection part between the two positions. The second draining line may traverse the beverage outlet part or be placed adjacent thereto. Therefore, opening of the second draining line can be controlled by simply activating the motor for opening the brewing unit. There is no need for an additional control of mobile parts and the solution remains simple and reliable.

The device may comprise a receptacle identification means providing inputs to the control unit as to the presence and absence of the beverage receptacle in engagement with the beverage injector and wherein the control unit is arranged to open the brewing unit in response to an input indicative of the absence of the receptacle.

Therefore, it is possible to abort the preparation of the beverage and proceed to the draining of the residual beverage, when the beverage receptacle is no longer identified, in particular, when it is removed accidentally or purposely.

The identification means for the receptacle can be any suitable identification means such as an optical reader, magnetic reader, electro-mechanical reader, electro-magnetic reader, inductive reader or a radiofrequency reader. The beverage receptacle is provided with an identifying means that can be complementarily arranged with the reader and can be of optical, opto-electronic, led display, magnetic, mechanic, ferro-magnetic, electro-magnetic, inductive means or a radiofrequency tag.

In a preferred mode, the receptacle identification means comprises at least one Hall sensor for sensing the magnetic effect of identifying means comprising at least one ferromagnetic element or at least one magnet in the receptacle.

Other characteristics and advantages will become apparent in the following non-limitative description of the drawings.

DETAILED DESCRIPTION OF THE DRAWINGS

Figure 1:
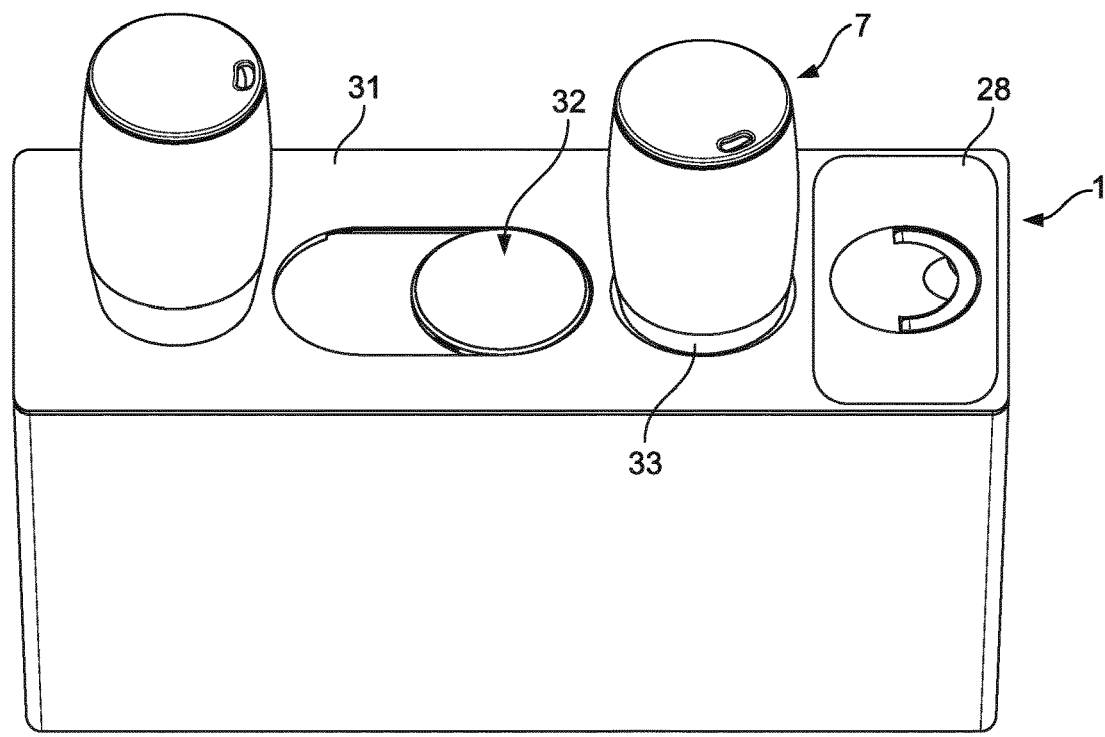
FIG. 1 shows a schematic perspective view of a beverage preparation device according to the invention.
Figure 2:
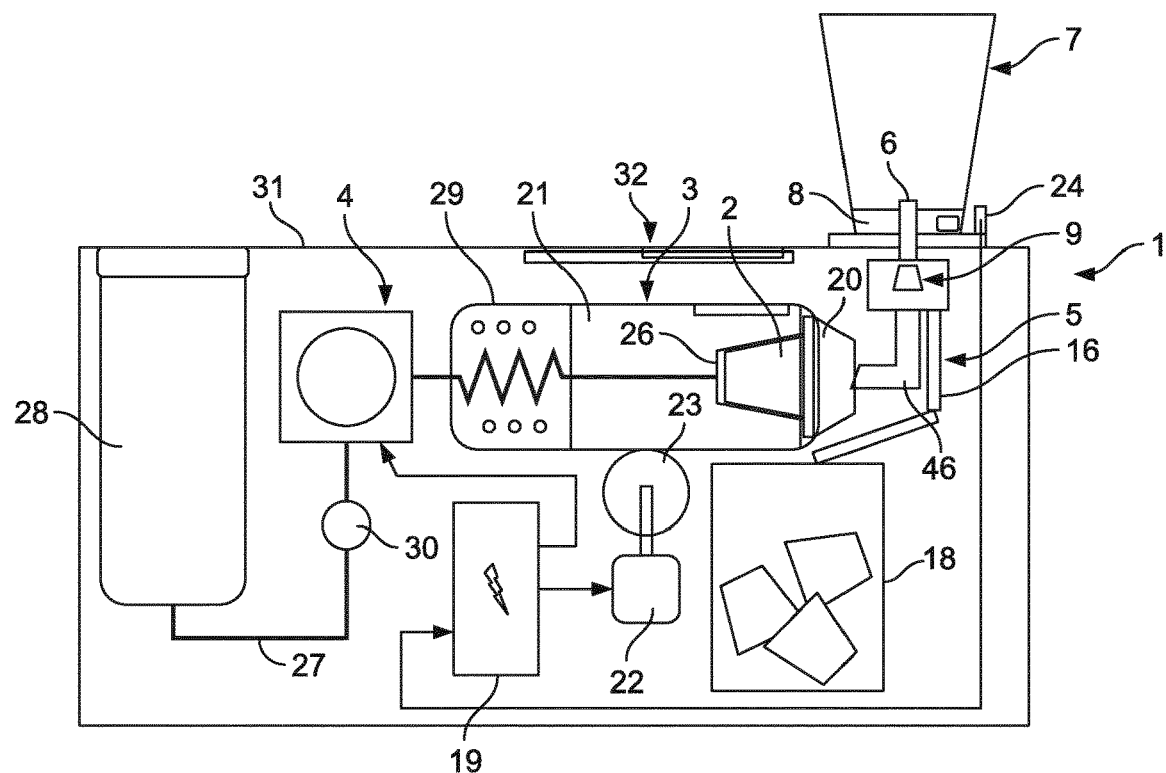
FIG. 2 shows a schematic cross-sectional view of the beverage preparation device according to the invention.

FIGS. 1 and 2 illustrate a beverage preparation device 1 of the invention that may be used under low voltage in a vehicle.

The device may comprise a brewing unit 3 which is adapted to receive a dose 2 of beverage ingredients (called "beverage dose" in the description). The ingredients can be roast and ground coffee or any other beverage powder or concentrate that can be mixed with liquid, preferably water to prepare a beverage. The dose can be a capsule or any other suitable prepacked or refilled container or pod. The dose may be a single-serve for one beverage or multi-serve for more than one beverage.

The dose is generally receivable in a brewing chamber 26 of the brewing unit that may open and close about the dose and form a liquid-tight engagement for ensuring that liquid injected in the chamber traverses the dose.

The beverage device comprises a pressure pump 4 arranged in the fluid circuit 27 of the device to supply liquid to the brewing unit 3, more particularly to its brewing chamber. The pressure pump can be any suitable pump such as a piston pump, a gear pump, a syringe pump or a diaphragm pump.

Liquid is supplied to the pump from a liquid supply such as a water tank 28. The water tank is preferably removably connectable to a first end of the fluid circuit 27. The first end may comprise a closure valve such (not illustrated) to provide a fluid closure when the water tank is removed for being refilled.

Liquid can be heated in the beverage device by at least one liquid heater 29. The liquid heater is arranged to heat liquid supplied under pressure by the pressure pump before it enters the brewing chamber 26. The liquid heater can be part of the brewing unit or be a separated part thereof.

Beverage is prepared in the brewing chamber by interaction of the beverage ingredients and supplied liquid in controlled amount.

The brewing unit 3 more particular comprises an outlet part 20 and a liquid injection part 21. The liquid injection part is connected to the fluid circuit 27, pump and heater. The outlet part 20 is connected to beverage dispensing means 5 arranged for guiding beverage to a beverage injector 6. The beverage injector 6 which is arranged for dispensing the beverage to a beverage receptacle 7 such as a cup. Preferably, the beverage injector 6 and receptacle 7 are complementarily configured to enable the dispensing of the beverage through the bottom 8 of the receptacle. In FIG. 1, the beverage dispensing means are positioned between the water tank 28 and the brewing unit 3. In FIG. 2, the brewing unit is positioned between the water tank 28 and the beverage dispensing means 5. These two configurations are therefore possible.

The control of the beverage preparation device is obtained by a control unit 19 that received input from components of the device and provides output to components of the device. In particular, a flow metering means such as a flow meter 30 may be provided in the fluid circuit to provide information indicative of the flow rate and/or volume of liquid supplied to the brewing unit by the pressure pump. The flow and/or pressure of the liquid in the fluid circuit may additionally or alternatively be determined by information provided by the pressure pump 4 to the control unit 19 such as for example, the absorbed electrical current measured at the pump.

The outlet part 20 and the liquid injection part 21 of the brewing unit may be moved relative to each other between an open (dose insertion) position and a closed (brewing) position by a motor 22 and a transmission 23. The motor can be a low power motor and the transmission can be such as described in WO 2012/025259 for example. The two parts 20, 21 are generally moved away, e.g. linearly, into the opening position to form a passage for inserting the dose in the brewing unit and for removing the dose from the brewing unit. The dose may be removed by gravity fall into a collecting reservoir 18. As will be described, such reservoir may also advantageously be the residual beverage reservoir.

The device may further comprise a body 31 provided with a gate 32 driven by the liquid injection part 21 and associated with a passage 48 (FIG. 9) and movable between an opening-passage position and a closing-passage position. In particular, the gate may be manually slidable as in WO2012093107 or be connected to the movable part 21 by an intermediate mechanical conversion mechanism for converting movements of the movable part into movements of the gate as in WO2012072766.

Figure 3:
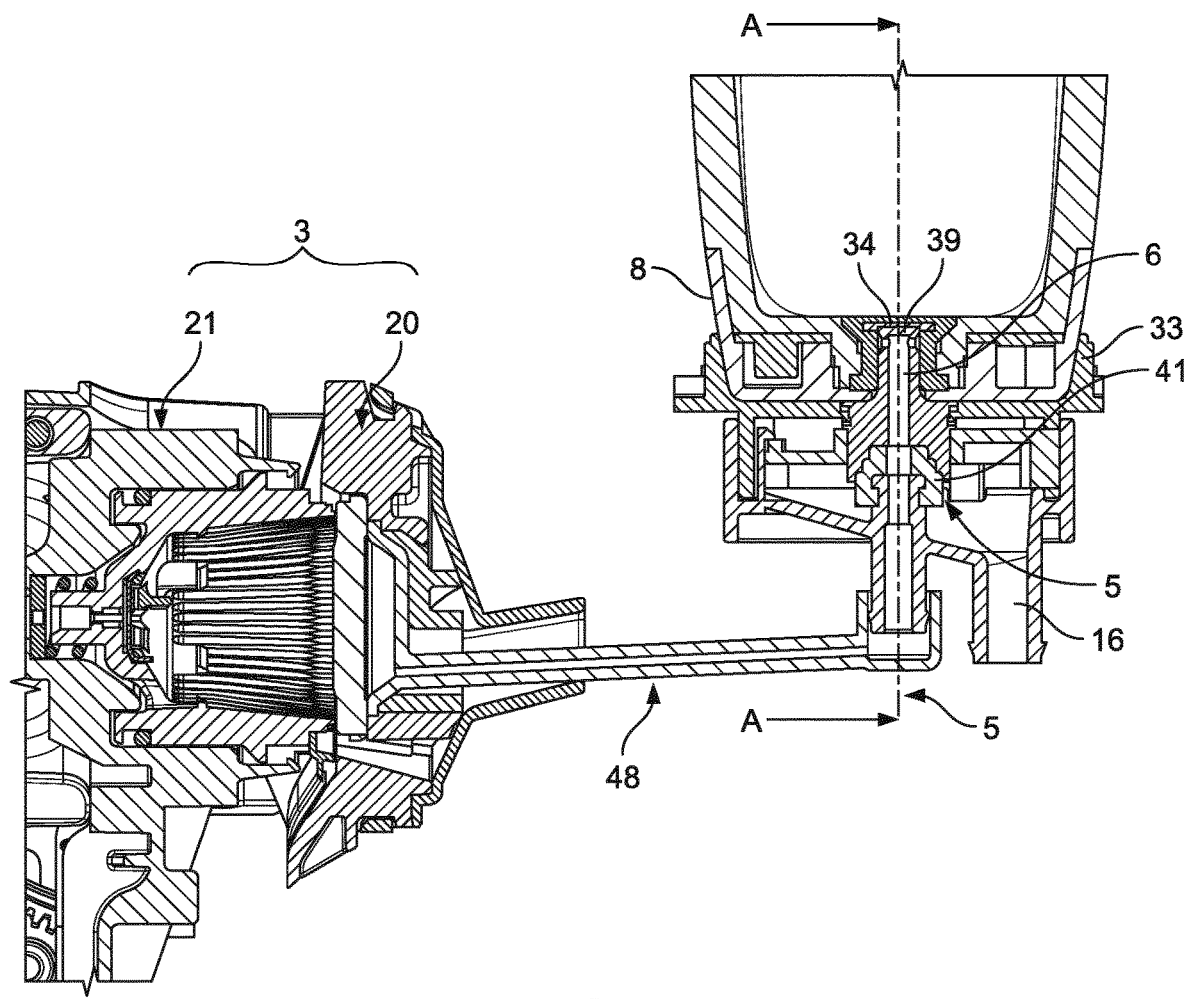
FIG. 3 shows a partial cross-sectional view of the beverage preparation device according to the invention in beverage dispensing position.
Figure 4:
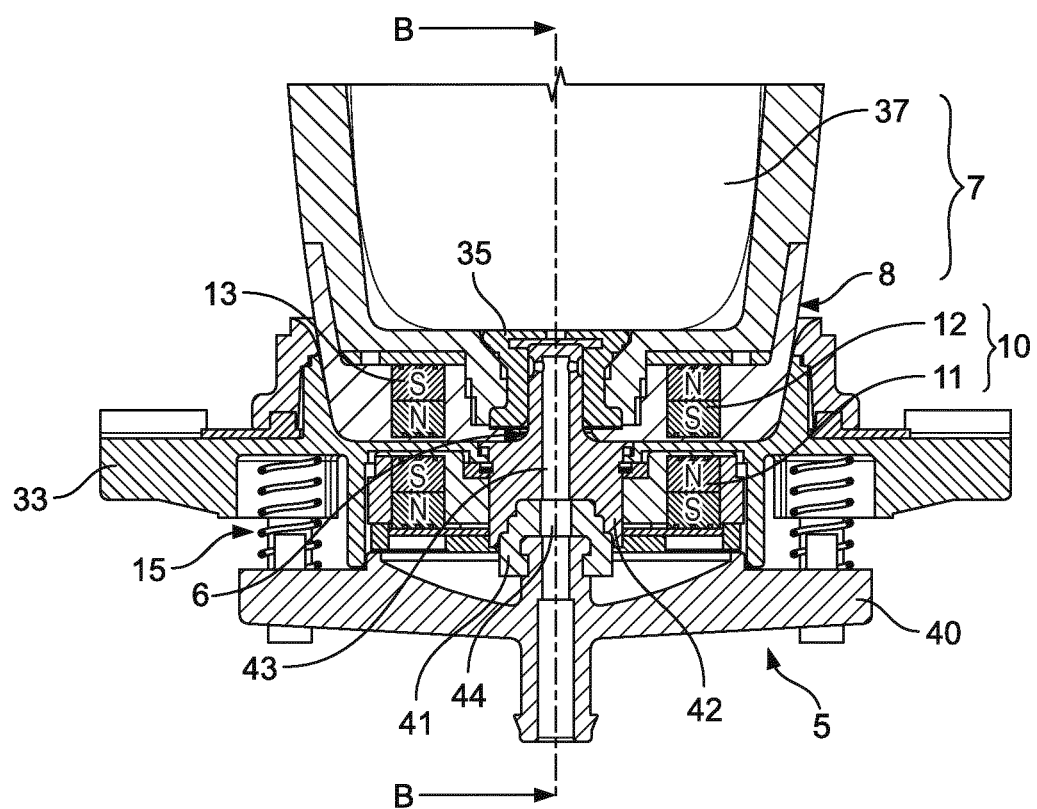
FIG. 4 shows a cross-sectional view in plane A-A of FIG. 3 showing a detail of the device.

As illustrated in FIGS. 3 and 4, the beverage dispensing means 5 comprise a beverage injector 6 that is arranged to dispense beverage through the bottom 8 of the receptacle.

For this, the beverage injector protrudes beyond the bottom surface of a receptacle support 33. The support may be conformed as a small receptacle to receive the bottom of the receptacle. The beverage injector may have beverage apertures 34 for dispensing the beverage.

The receptacle may comprise a complementary injecting valve 35 formed to receive the beverage injector 6. The valve 35 may have several apertures 36 (see FIG. 6) that enable to dispense beverage to the cavity 37 of the receptacle. The injecting valve 35 may be axially moveable, e.g., axially, in a seat 38 of the receptacle between a closed position in which the apertures 36 are closed by the seat and an open position in which the apertures 36 are moved away from the seat and open for dispensing. In particular, the beverage injector 6 may be formed with engaging means 39 to move the injecting valve of the receptacle between the two positions. Of course other variations of injection interface can be thought of.

Importantly, the invention provides a residual beverage draining valve 9 (called "draining valve" in the rest of the description) arranged in the beverage dispensing means for draining residual beverage when the beverage receptacle is removed or disengaged from the beverage injector 6. The draining valve 9 is positioned between the beverage injector 6 and the brewing unit 3 and is arranged to be moved between a beverage dispensing position (FIGS. 3-5) and a beverage draining position (FIGS. 6-9). For this, activation means 10 may be provided which may be mechanical and/or magnetic and which are arranged for automatically driving the valve in open position when the receptacle is removed or separated from the beverage injector.

Reversely, the activation means 10 are arranged for closing the valve in beverage dispensing position when the receptacle is engaged with the beverage injector 6.

In the preferred illustrated example, the activation means 10 comprise magnetic activation means which are shared between the receptacle 7 and the beverage dispensing means 5. In particular, magnetic activation members 11, 12 are complementary arranged on the draining valve and in the receptacle bottom respectively.

More particularly, the draining valve may comprise a body 40 axially and slidably mounted with the receptacle support 33. The draining valve may further comprise a valve engaging part 41, e.g. conically shaped, which is shaped to liquid tightly conform to a valve seat 42 of a beverage inlet 43 of the beverage injector 6.

Figure 5:
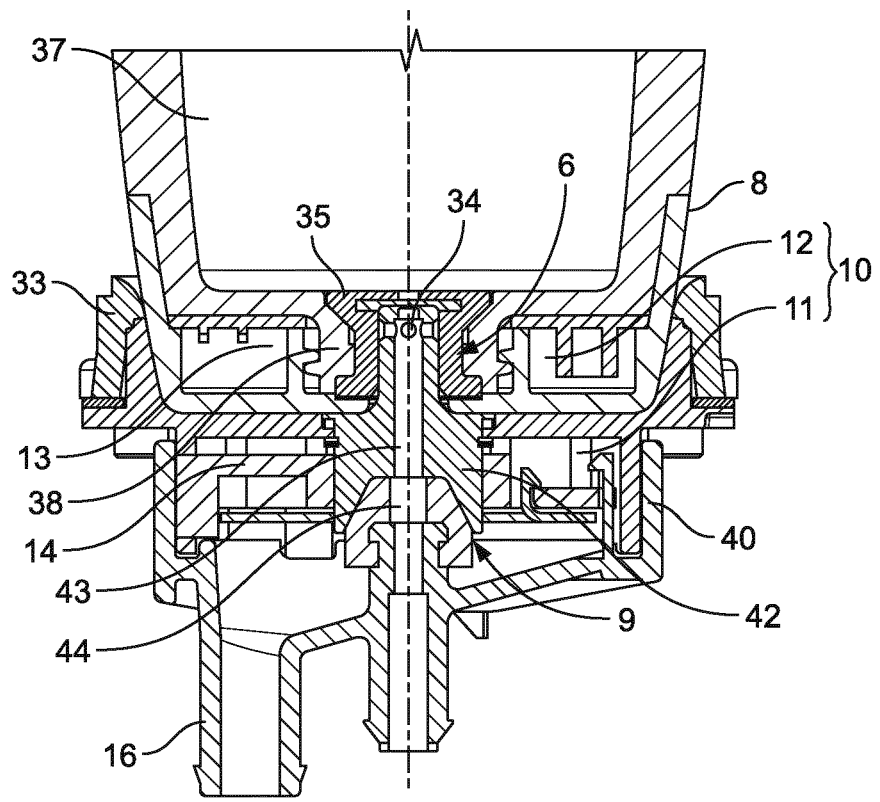
FIG. 5 shows a cross-sectional view in plane B-B of FIG. 4 showing a detail of the device.

In the closing position of the valve as illustrated in FIGS. 3 to 5, the valve outlet 44 of the draining valve becomes adjacent with the inlet 43 of the beverage injector and the valve part 41 engaged with the seat 42 of the beverage injector.

Figure 6:
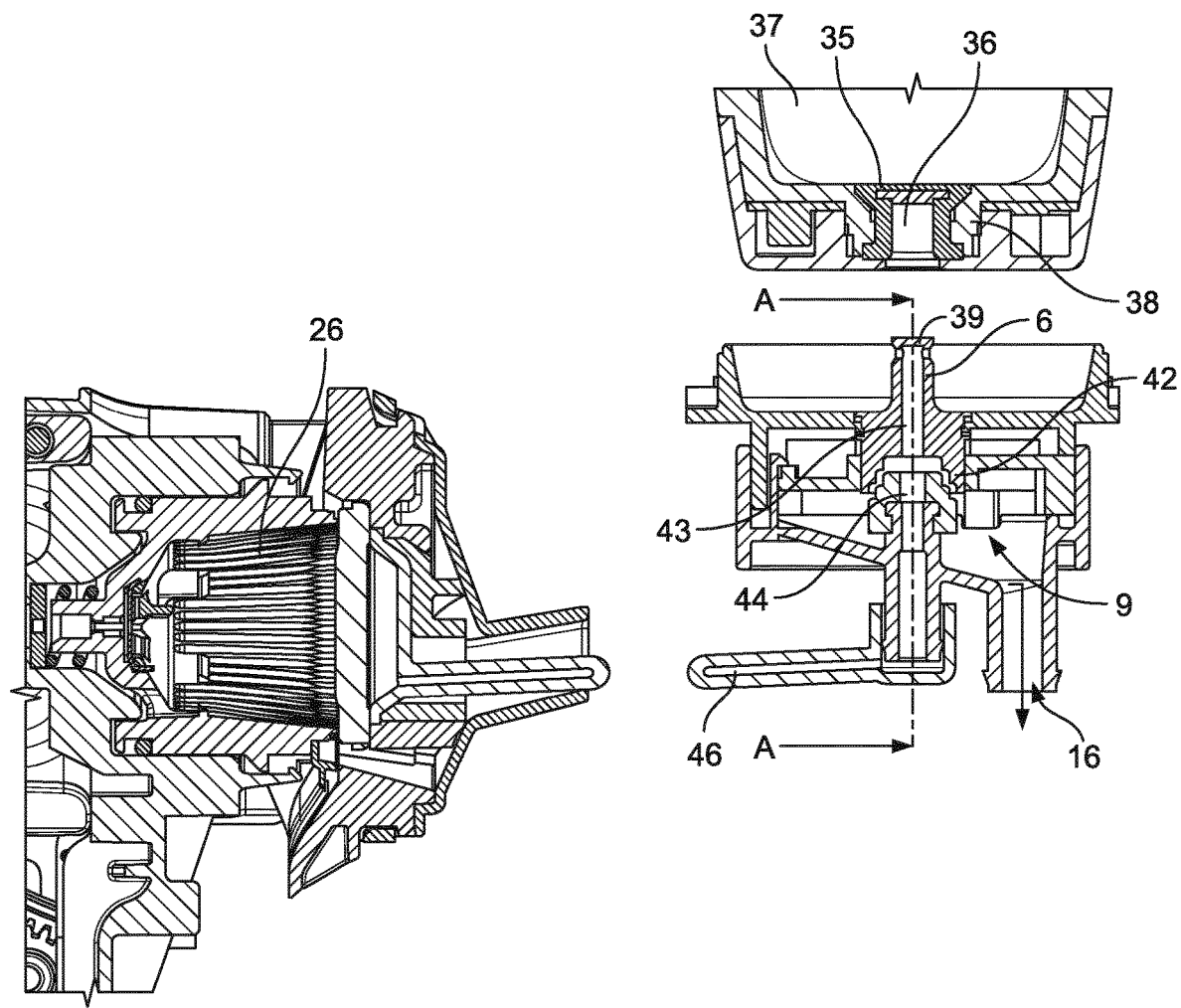
FIG. 6 shows a partial cross-sectional view of the beverage preparation device according to the invention in a first residual beverage draining position.
Figure 7:
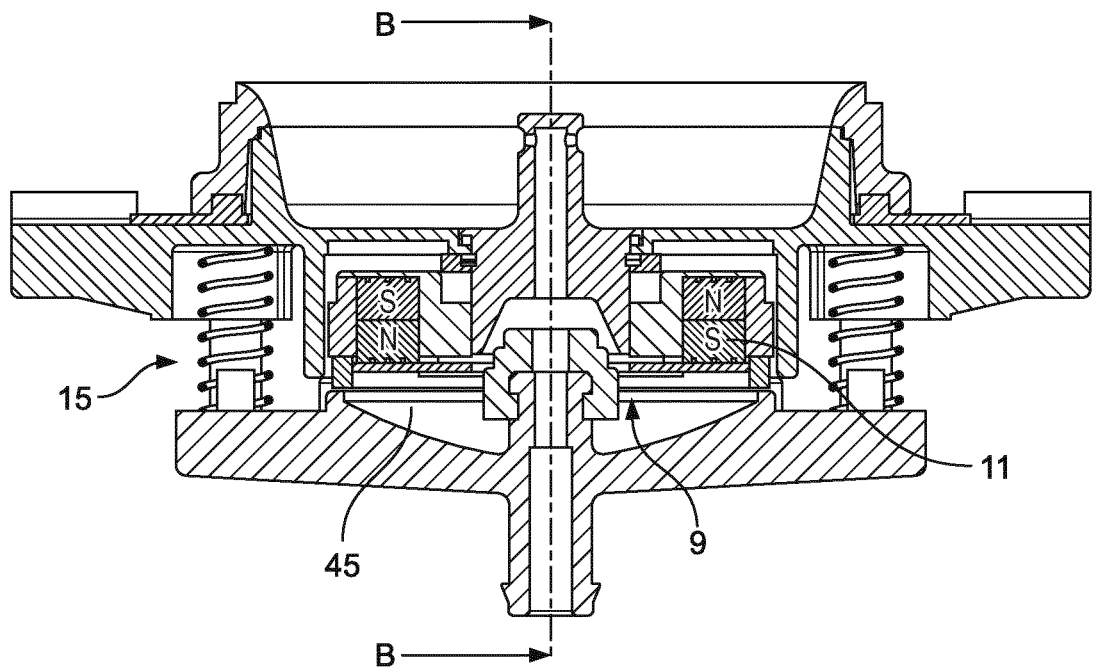
FIG. 7 shows a cross-sectional view in plane A-A of FIG. 6 showing a detail of the device.
Figure 8:
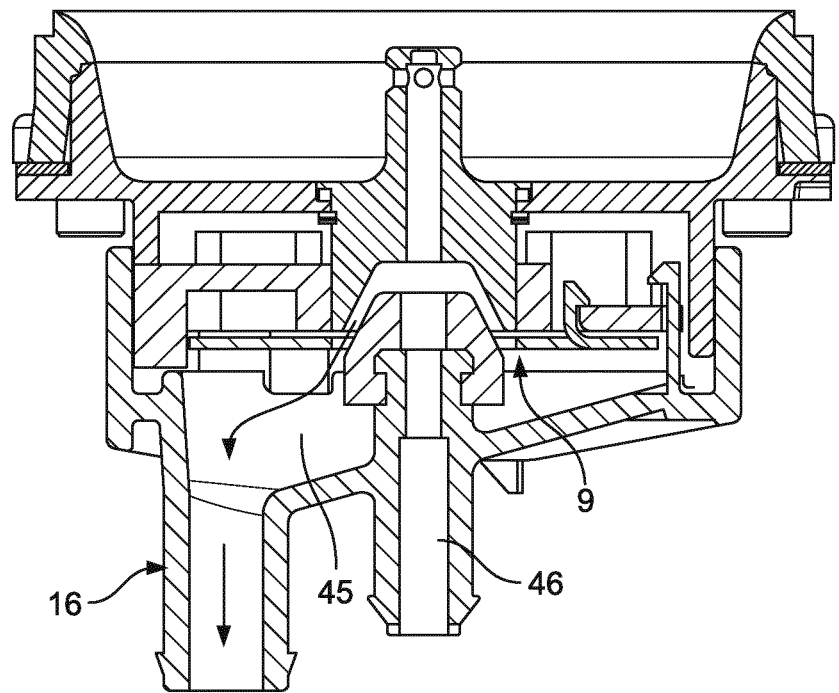
FIG. 8 shows a cross-sectional view in plane B-B of FIG. 7 showing a detail of the device.

In the open draining position as illustrated in FIGS. 6-8, the body 40 is moved axially away from the support and the valve outlet 44 becomes distant from the beverage inlet 43 and so is the engaging part 41 out of the valve seat 42.

Figure 10:
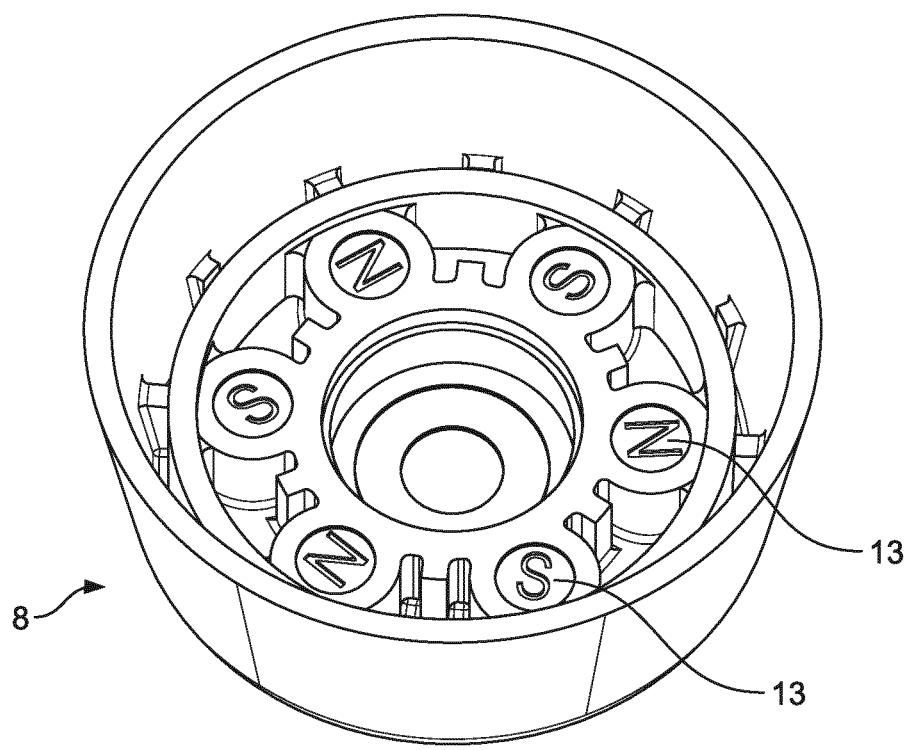
FIG. 10 shows a detail of the beverage receptacle.

In a preferred example, the magnetic activation members 11, 12 preferably comprise a series of alternating magnetic poles 13 arranged about the circumference of the bottom 8 of the receptacle (FIG. 10) and a series of alternating magnetic poles 14 arranged circumferentially in the draining valve body 40.

In a non-limitative way, FIGS. 4 and 5 show a connection assembly of the receptacle on the support of the device enabling to position the receptacle in "n" numbers of predetermined angular positions (with n being a natural number equal or greater than 1, for example n=3 in the present example). In particular, the bottom 8 of the receptacle comprises a series of 2×n magnets 12 distributed circumferentially in the bottom in alternate polarity (N-S-N-S-N-S) and are oriented axially. The magnets interact in magnetic arrangement with a series of 2×n magnets 11 which are distributed circumferentially inside draining valve body 40 in alternate polarity (S-N-S-N-S-N) and also oriented axially. As a result, when the receptacle is engaged with the beverage injector, the receptacle is attracted in three possible angular positions by correspondence of S-N or N-S magnetic attractions of 2×n pairs of magnets. The term "axially" refers to a direction than is substantially aligned or parallel to the injector or conduit of the injector. The term "circumferentially" refers to a circumferential arrangement arranged about the beverage injector.

The valve activation means 10 may further comprise elastic return means 15 for urging the draining valve back into the residual beverage draining position of FIGS. 7 and 8. For this, the elastic return means may be a series of compressively elastic elements, such as helical springs, positioned between the body 40 of the draining valve and the receptacle support 33. Therefore, in absence of magnetic attraction on the magnet activation member 11 of the support (when the receptacle is not present), the springs force maintains the draining valve away from the beverage support thereby maintaining the valve open for drainage.

In the position of the draining valve of FIGS. 6 to 8, the draining valve is moved away from the support since no receptacle is engaged by the beverage injector. The brewing unit 3 may be still closed with a dose inside. In this situation, a first draining line 16 is provided as part of the beverage dispensing means 5 for enabling beverage contained upstream the draining valve 9 to drain down to a residual beverage reservoir. The reservoir may be the same as the one 18 for the used doses. The first draining line may comprise a drain conduit that merges with a collecting cavity 45 of the body of the draining valve.

Therefore, as soon as the receptacle is removed from the beverage support, the draining valve tends to open by effect of the elastic return means 15 and the pressure of beverage in the injector is instantaneously released thereby preventing the risk of hot jetting of beverage upwards.

Figure 9:
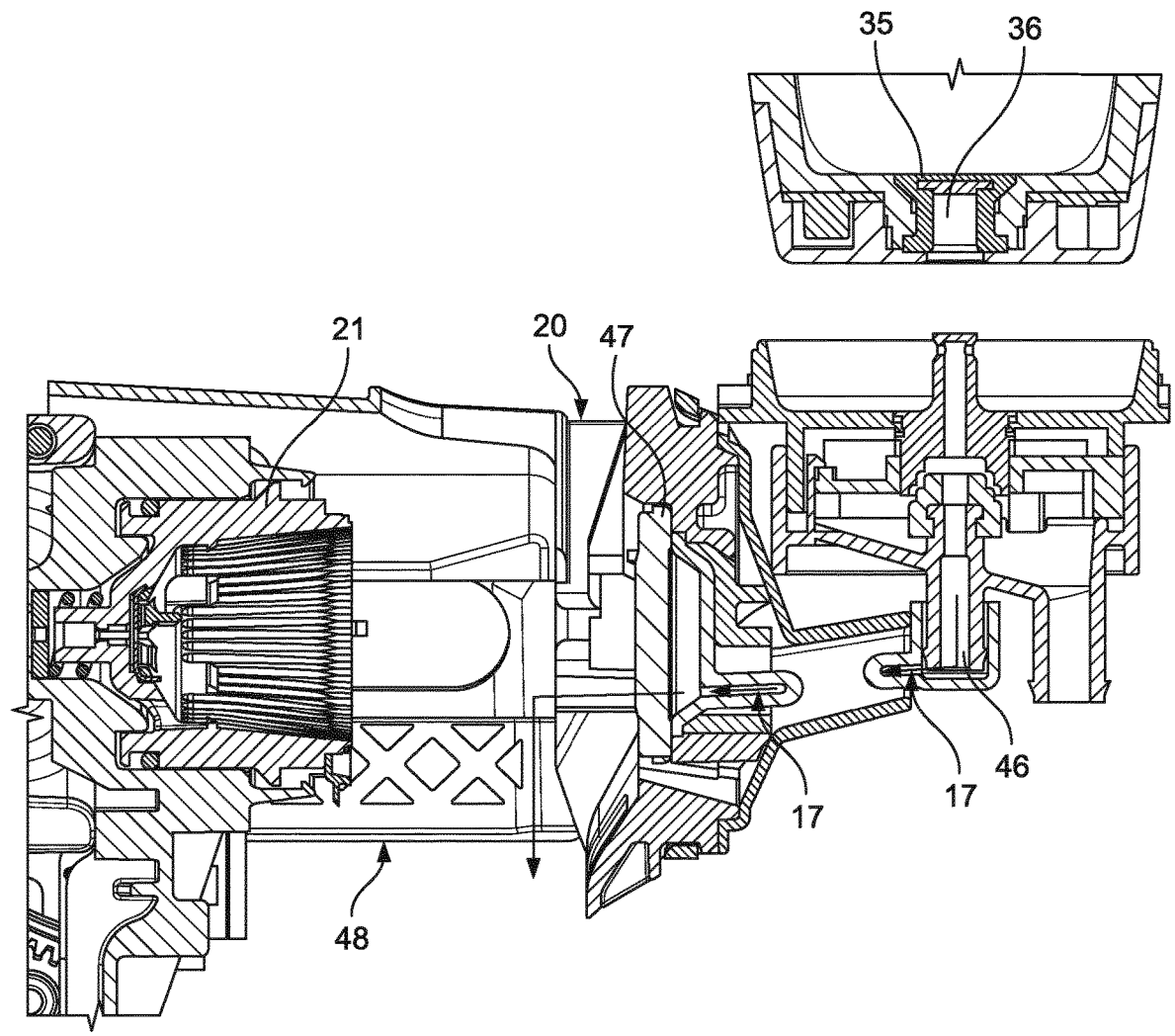
FIG. 9 shows a partial cross-sectional view of the beverage preparation device according to the invention in a second residual beverage draining position.

When the brewing unit 3 is opened as illustrated in FIG. 9, a second draining line 17 is consequently opened. The residual beverage is drained through the beverage dispensing conduit 46 located between the draining valve and the outlet part 20 of the brewing unit. The outlet part 20 may comprise at least one beverage aperture provided in the outlet part. Beverage can traverse the beverage aperture of the front plate 47 and be drained through the passage 48 for the dose (e.g. capsule). Such aperture may be at least one of the beverage through-apertures of the front plate 47 and provided for dispensing the beverage to the beverage dispensing means 5. Alternatively or additionally, it can be a separate aperture or apertures provided in the outlet part 20 which is or are opened only when the brewing unit is opened. Beverage is then collected in the residual beverage reservoir 18 positioned beneath the passage 48.

Figure 11:
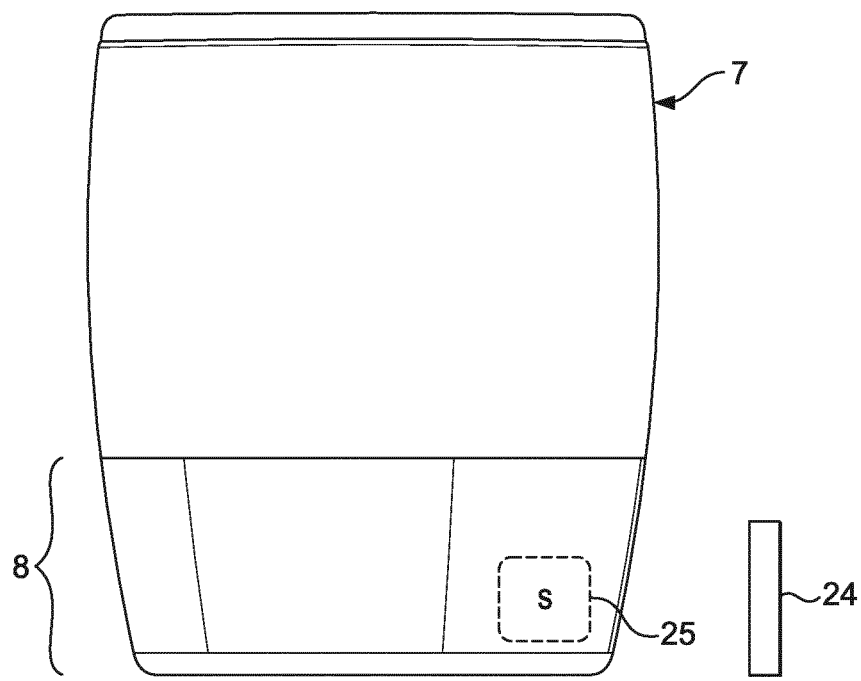
FIG. 11 shows a beverage receptacle with an identifying means capable of being identified by an identification means of the device.
Figure 12:
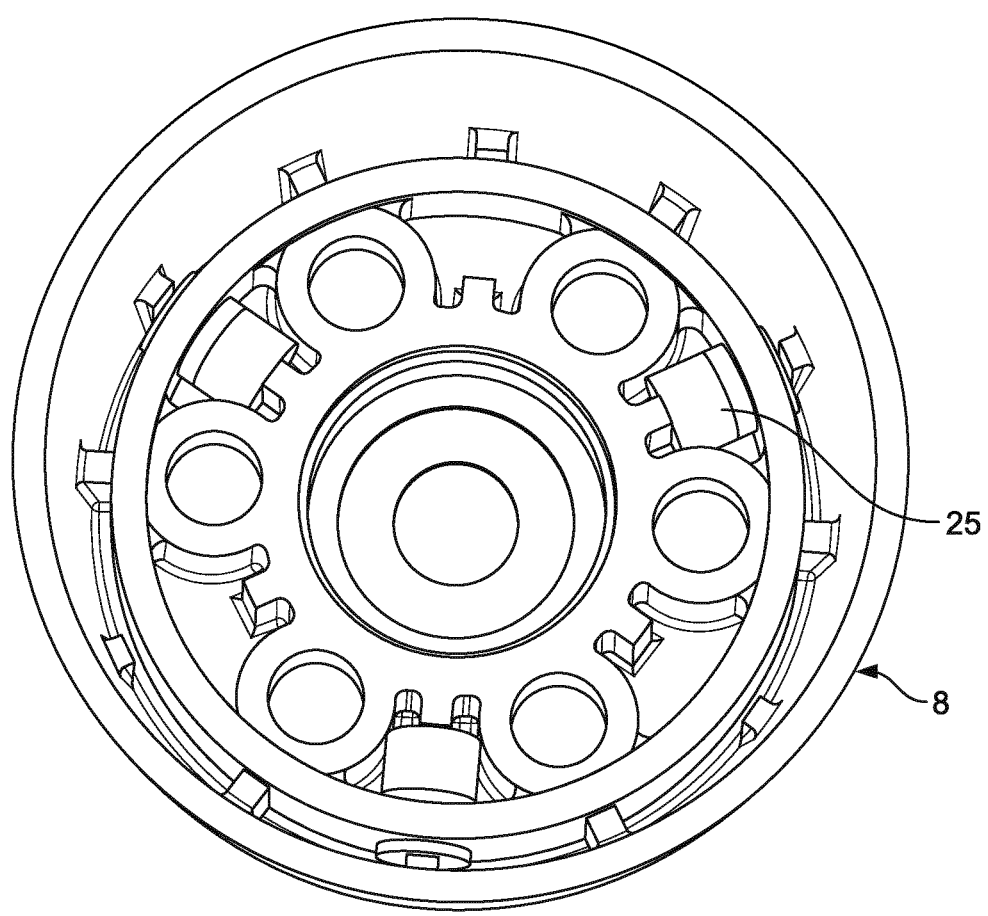
FIG. 12 shows the bottom of a receptacle with identifying means.

In FIGS. 11 and 12 is illustrated respectively a beverage receptacle 7 with identifying means 25 for enabling the control unit to identify the presence of the receptacle when placed in correspondence with receptacle identification means 24 of the device. These identifying means 25 may, for instance, be magnetic members of oriented polarity such as North (N) for a receptacle of large volume receptacle and South (S) for a receptacle of smaller volume. The identification means 24 may be a Hall sensor or other suitable sensing means that may differentiate the polarity presented by the receptacle and therefore may provide to the control unit an indication as to the type of receptacle present on the beverage device (such as when engaged by the beverage injector 6).

In FIG. 12, it is shown that a series of "n" additional magnets 25 are provided (in this example, n=3), which are all oriented radially in a selected polarity (N or S) depending on the type of receptacle. Therefore, for example, the "n" magnets of the receptacle of small volume are radially positioned with South Poles oriented inwardly whereas the orientation is opposite for a receptacle of large volume.

Furthermore, the Hall sensor is positioned in correspondence with at least one predetermined position of any of such radially oriented magnets considering the "n" number of positions of the receptacle connected to the support. As a result, the Hall sensor is capable of identifying reliably which type of receptacle (short or long) is engaged by the injector on the support.

A single magnet 25 may be used to as identifying means. In that case, "n" Hall sensors are positioned to detect the magnet which can be positioned in "n" different positions.

Such receptacle type information can then be used by the control unit primarily for detecting the presence of the receptacle on the support but secondarily to determine the maximum volume of liquid to supply to the brewing unit by the pressure pump.

Of course, other identifying means could be used such as a radiofrequency tag, mechanical pins or a barcode that may provide additional information such as more than two types of beverage receptacles and/or beverage preparation instructions.

Figure 13:
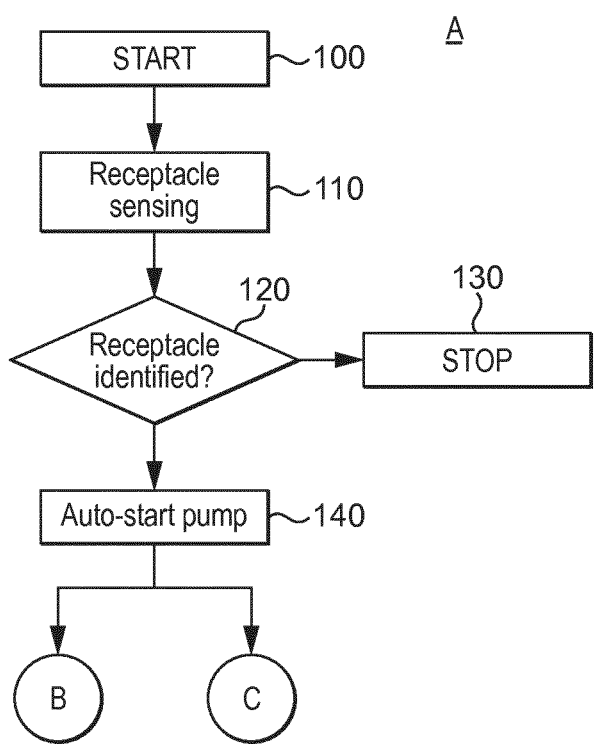
FIG. 13 shows a flow chart of a procedure for starting the beverage preparation in the device.
Figure 14:
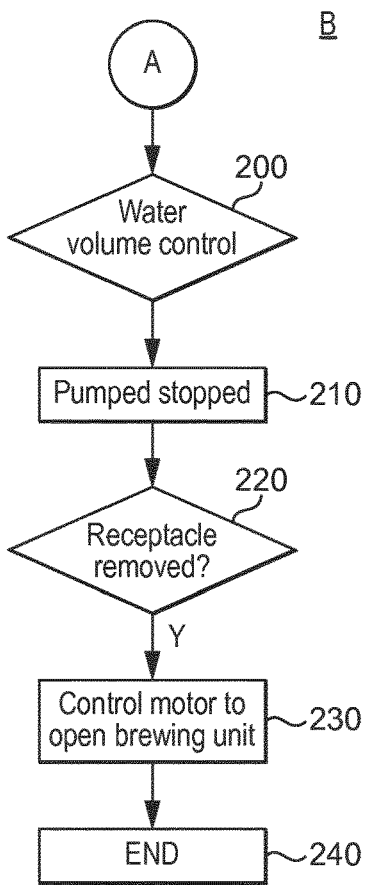
FIG. 14 shows a flow chart of the procedure for ending a standard beverage preparation in the device.

FIG. 13 illustrates a control scheme or preliminary preparation procedure A of the control unit for preparing a beverage according to the beverage preparation device. The preparation may start by push-off or start event 100. Such push-off may be automatic such as triggered by the detection and/or insertion of a dose in the brewing unit or manual such as by the start button.

In a second step 110, the presence of a beverage receptacle is sensed by the identification means 24 such as by the Hall sensor. The identification information is provided as input to the control unit which carries out a comparison test 120 to determine if the receptacle is identified properly and eventually which type of receptacle is present (e.g., small or large volume).

If the identification is unsuccessful in test 120, the procedure may be stopped (step 130).

In step 140, if the receptacle is correctly identified, the control unit starts automatically the brewing cycle. The control unit may also determine or calculate the volume of liquid (generally water) necessary for preparing the beverage when the type of receptacle is identified.

The preliminary preparation procedure of the beverage A is over. Of course, multiple variants may be envisaged such as additional tests or the requirement of a final decision to start the next preparation procedure B requested to the user.

In a following preparation procedure B corresponding to a standard preparation procedure, the volume of liquid is preferably repeatedly controlled in step 200 by the control unit receiving input from the flow meter 30, and/or other flow measuring means, and stopping the pump and/or adjusting flow rate of the pump in response to the flow input. In step 210, the pump is stopped by the control unit when the liquid volume has reached the volume set point or upon another particular event that requires the pump to be stopped and the beverage preparation to be aborted or paused. Upon receiving an input from the identification means 24, the control unit detects the removal of the receptacle by the user in test 220. The removal of the receptacle induces the opening of the draining valve and a preliminary draining of the residual beverage contained in the injector. The removal of the beverage receptacle further triggers the automatic opening of the brewing unit operated by the control unit on the motor 22 in step 230. As a result, the full draining of the residual beverage is obtained. The preparation procedure comes to an end in step 240.

Figure 15:
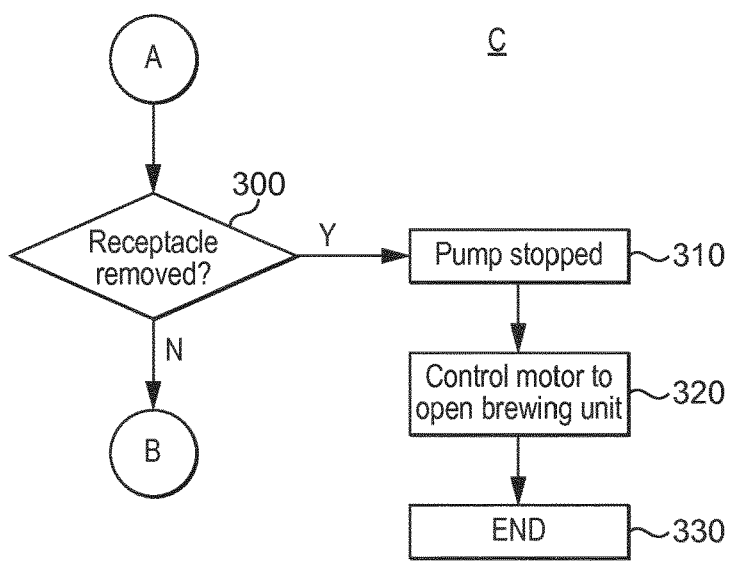
FIG. 15 shows a flow chart of a safety sub-procedure for ending the beverage preparation in case the receptacle is removed before the end of the standard beverage preparation.

FIG. 15 illustrates a safety sub-procedure C in which the receptacle is removed while the pressure pump is still active and the beverage is dispensed. In the event 300 the receptacle is removed, the control unit receives input from the identification means 24 and the pump is immediately stopped in step 310 and the brewing unit is opened in the following step 320. The safety procedure is ended in step 330. If no such event is received, the procedure B is continued to the end.

NUMERICAL REFERENCES

1. Beverage preparation device
2. Beverage dose
3. Beverage unit
4. Pressure pump
5. Beverage dispensing means
6. Beverage injector
7. Receptacle
8. Bottom of receptacle
9. Beverage draining valve
10. Valve activation means
11. Magnetic activation member (device)
12. Magnetic activation member (receptacle)
13. Alternating magnetic pole (receptacle)
14. Alternating magnetic pole (device)
15. Elastic return means
16. First draining line
17. Second draining line
18. Residual beverage reservoir
19. Control means
20. Outlet part
21. Liquid injection part
22. Motor
23. Transmission
24. Receptacle identification means
25. Identifying means
26. Brewing chamber
27. Fluid circuit
28. Water tank
29. Liquid heater
30. Flow meter
31. Body
32. Gate
33. Receptacle support
34. Beverage apertures
35. Injecting valve
36. Valve apertures
37. Cavity
38. Seat
39. Engaging means
40. Body of draining valve
41. Valve engaging part
42. Valve seat
43. Beverage inlet
44. Valve outlet
45. Collecting cavity
46. Dispensing conduit
47. Front plate
48. Passage

The invention claimed is:

1. A beverage preparation device for preparing a beverage from a beverage dose, the beverage preparation device comprising:
   a brewing unit configured for receiving the dose and preparing the beverage fromingredients contained within the dose and pressurized liquid injected in the dose;
   a pressure pump configured for supplying the pressurized liquid to the brewing unit;
   a beverage dispensing member connected to the brewing unit and comprising a beverage injector configured for dispensing the beverage through a bottom of a beverage receptacle,
   wherein the beverage dispensing member comprises a residual beverage draining valve, between the beverage injector and the brewing unit, the residual beverage draining valve is configured to be moved between a beverage dispensing position and a beverage residual draining position,
   the residual beverage draining valve and/or the beverage receptacle comprise a valve activator configured to move the residual beverage draining valve between (i) the beverage dispensing position in response to engagement of the bottom of the beverage receptacle with the beverage injector and (ii) the beverage residual draining position in response to removal of the beverage receptacle from the beverage injector; and
   a draining line configured for draining residual beverage contained between the residual beverage draining valve and the brewing unit, and the draining line is opened to a residual beverage reservoir by effect of opening of the brewing unit.

2. The beverage preparation device according to claim 1, wherein the valve activator comprises magnetic activation members complementarily arranged on the residual beverage draining valve and the beverage receptacle respectively for moving by magnetic effect the residual beverage draining valve from the beverage residual draining position to the beverage dispensing position.

3. The beverage preparation device according to claim 2, wherein the magnetic activation members comprise a series of alternating magnetic poles arranged about a circumference of the bottom of the beverage receptacle, and the magnetic activation members further comprise a series of alternating magnetic poles arranged circumferentially in the residual beverage draining valve.

4. The beverage preparation device according to claim 2, wherein the valve activator further comprises an elastic return configured for urging the residual beverage draining valve back into the residual beverage draining position.

5. The beverage preparation device according to claim 1, wherein the beverage dispensing member comprises an additional draining line connecting the beverage injector via the residual beverage draining valve to the residual beverage reservoir when the residual beverage draining valve is in the residual beverage draining position.

6. A beverage preparation device for preparing a beverage from a beverage dose, the beverage preparation device comprising:
   a brewing unit configured for receiving the dose and preparing the beverage from ingredients contained within the dose and pressurized liquid injected in the dose;

a pressure pump configured for supplying the pressurized liquid to the brewing unit;

a beverage dispensing member connected to the brewing unit and comprising a beverage injector configured for dispensing the beverage through a bottom of a beverage receptacle, wherein the beverage dispensing member comprises a residual beverage draining valve, between the beverage injector and the brewing unit, the residual beverage draining valve is configured to be moved between a beverage dispensing position and a beverage residual draining position, the residual beverage draining valve and/or the beverage receptacle comprise a valve activator configured to move the residual beverage draining valve between (i) the beverage dispensing position in response to engagement of the bottom of the beverage receptacle with the beverage injector and (ii) the beverage residual draining position in response to removal of the beverage receptacle from the beverage injector; and a controller configured for immediately interrupting the pressure pump and/or opening of the brewing unit when the beverage receptacle is removed from the beverage injector.

7. The beverage preparation device according to claim 6, wherein the brewing unit comprises a beverage outlet part and a liquid injection part movably arranged relative to each other between an opened position and a closed position, the beverage preparation device further comprises a motor and a transmission configured for moving the beverage outlet part and the liquid injection part between the opened position and the closed position, and a draining line traverses the beverage outlet part or is placed adjacent thereto.

8. The beverage preparation device according to claim 6 comprising a receptacle identification member providing to the controller inputs of presence and absence of the beverage receptacle in engagement with the beverage injector, wherein the controller is configured to open the brewing unit in response to an input indicative of the absence of the beverage receptacle.

9. The beverage preparation device according to claim 8, wherein the receptacle identification member comprises at least one Hall sensor configured for sensing a magnetic effect of an identifying member comprising at least one ferro-magnetic element or at least one magnet in the beverage receptacle.

* * * * *